(12) United States Patent
Metz

(10) Patent No.: US 9,784,388 B1
(45) Date of Patent: Oct. 10, 2017

(54) PIPE LINER FOR ABRASIVE MATERIALS

(71) Applicant: Interstate Power Systems, Inc., Minneapolis, MN (US)

(72) Inventor: Michael Metz, Billings, MT (US)

(73) Assignee: Interstate Power Systems, Inc., Minneapolis, MN (US)

(*) Notice: Subject to any disclaimer, the term of this patent is extended or adjusted under 35 U.S.C. 154(b) by 0 days.

(21) Appl. No.: 15/170,351

(22) Filed: Jun. 1, 2016

Related U.S. Application Data

(60) Provisional application No. 62/169,618, filed on Jun. 2, 2015.

(51) Int. Cl.
| | | |
|---|---|---|
| *F16L 55/00* | (2006.01) | |
| *F16L 57/06* | (2006.01) | |
| *F16L 11/127* | (2006.01) | |

(52) U.S. Cl.
CPC ............ *F16L 11/127* (2013.01); *F16L 57/06* (2013.01)

(58) Field of Classification Search
CPC ..... F16L 11/127; F16L 57/0625; F16L 25/02; B25G 53/523
USPC .............. 138/36, 98, 109; 405/150.1, 184.2; 285/55, 16; 174/47, 78
See application file for complete search history.

(56) References Cited

U.S. PATENT DOCUMENTS

| | | | |
|---|---|---|---|
| 3,457,359 A | 7/1969 | Soucy | |
| 3,963,856 A | 6/1976 | Carlson et al. | |
| 3,994,514 A | 11/1976 | Zimmerer et al. | |
| 4,215,384 A | 7/1980 | Elson | |
| 4,405,969 A | 9/1983 | Swavely | |
| 4,675,780 A * | 6/1987 | Barnes | F16L 11/127 138/103 |
| 4,684,155 A * | 8/1987 | Davis | B65G 53/523 138/139 |
| 4,685,983 A | 8/1987 | Long, Jr. | |
| 4,691,740 A | 9/1987 | Svetlik et al. | |
| 4,733,889 A * | 3/1988 | Haines | F16L 57/06 285/16 |
| 5,374,174 A | 12/1994 | Long, Jr. | |
| 5,468,091 A | 11/1995 | Arnold et al. | |
| 5,553,896 A * | 9/1996 | Woodward | F16L 25/025 285/242 |

(Continued)

OTHER PUBLICATIONS

Putzmeister Pipe Technology, "Concrete Delivery Hoses", http://www.putzmeisteramerica.com/products/subcategory/Concrete . . . , last accessed Sep. 3, 2014.

(Continued)

*Primary Examiner* — Patrick F Brinson
(74) *Attorney, Agent, or Firm* — Haugen Law Firm PLLP

(57) ABSTRACT

An electrically grounded wear resistant liner is described that inserts into a conventional frac sand delivery conduit. The liner allows for conveyance of highly abrasive materials through the liner and conduit while electrically grounding potential static build up from within the liner. Sand, cement and other abrasive slurries may be conveyed through the liner. The wear resistant liner extends the amount of time that the conduit may be used to convey materials without downtime for replacement and repairs. The liner further provides a tri layer construction that includes a middle layer having a color notably different than the outer and inner layers, allowing a user in the fields to quickly determine that the conduit should be replaced.

17 Claims, 10 Drawing Sheets

(56) References Cited

U.S. PATENT DOCUMENTS

| | | | | |
|---|---|---|---|---|
| 5,813,437 | A | * | 9/1998 | Esser .................. B65G 53/523 138/109 |
| 6,206,993 | B1 | | 3/2001 | Kiest, Jr. et al. |
| 6,228,312 | B1 | | 5/2001 | Boyce |
| 6,467,812 | B1 | * | 10/2002 | Klemm .................. E04G 21/04 285/112 |
| 6,854,479 | B2 | | 2/2005 | Harwood |
| 7,367,362 | B2 | | 5/2008 | Rice et al. |
| 7,857,553 | B2 | * | 12/2010 | Tsuchie ..................... F16L 9/18 138/104 |
| 7,861,743 | B1 | * | 1/2011 | Wren ....................... F16L 57/06 138/97 |
| 8,069,880 | B2 | | 12/2011 | Friedrich et al. |
| 8,256,468 | B1 | | 9/2012 | Frew |
| 8,997,792 | B2 | * | 4/2015 | Betsinger ................ F16L 57/06 138/104 |
| 9,267,636 | B2 | * | 2/2016 | Chamberland ......... F16L 9/125 |
| 9,429,267 | B2 | * | 8/2016 | Dunn ....................... F16L 57/06 |
| 9,625,294 | B2 | * | 4/2017 | Schoohf .................. G01F 1/584 |
| 2003/0178201 | A1 | | 9/2003 | Gleim et al. |

OTHER PUBLICATIONS

Accord International, Inc., "No. MSD Material Handling Suction & Discharge Hose", "Sand Blast Hose". www.accordintl.com.
Parker Industrial Hose Customer Service, "Safetly and Technical Information", pp. 405-407.

\* cited by examiner

PIPE LINER FOR ABRASIVE MATERIALS

CROSS-REFERENCE TO RELATED APPLICATIONS

This application claims priority to U.S. Provisional Patent Application Ser. No. 62/169,618, filed on Jun. 2, 2015, the contents of which are being incorporated herein by reference in their entirety.

FEDERAL SPONSORSHIP

Not Applicable

JOINT RESEARCH AGREEMENT

Not Applicable

TECHNICAL FIELD

This invention pertains generally to delivery conduits for sand or other abrasive materials. More particularly, the invention pertains to an electrically grounded liner for a frac sand delivery conduit that includes a wear indicator.

BACKGROUND

Over the years, advances in hydraulic fracturing techniques used in oil and natural gas fields has required conveyance of large volumes of frac sand, proppants, or other abrasive materials through piping. For example, frac sand used in hydraulic fracturing is typically hauled in large quantities in trailers but first the sand must be conveyed to the trailer. Oftentimes, large diameter metal piping or fill tubes, that are welded or otherwise permanently attached to the trailer, are used to convey the abrasive frac sand into the trailer. Due to the abrasive nature of the frac sand, the metal piping or fill tubes are subjected to constant wear.

Although more cost effective replaceable rubber liners or inserts may be used within the metal piping, static electricity may be generated when the frac sand flows through the rubber liner. Specifically, as the sand flows through the rubber liner the collision between sand particles generates friction and creates minute amounts of electrical charge. The amount of charge increases as the flow rates and volumes increase. Electrical discharges in oil and natural gas fields are undesirable and, thus, electrically grounding the rubber liner is highly desirable. Further, due to the abrasive nature of sand, the rubber liner will wear and any electrical grounding built into the liner may be compromised. Thus, it is desirable to replace the liner prior to the electrical grounding of the liner becoming compromised.

SUMMARY

Embodiments according to aspects of the invention are capable of providing a wear indicator prior to compromising the grounding effectiveness of the replaceable pipe liner of the present invention. Further embodiments according to aspects of the invention are capable of providing an electrically grounded conduit for delivering abrasive materials that has an internal surface wear indicator.

An embodiment according to aspects of the invention includes an electrically grounded liner or insert for delivering abrasive materials through a frac sand fill tube of a frac sand trailer. The liner includes a delivery conduit, an electrically conductive annular flange extending radially outwardly from the conduit, a grounding band electrically coupling the delivery conduit and the flange, a clamp that retains the band against the delivery conduit and a coupling or adapter extending from an end of the liner. The delivery conduit has a first electrically insulating outer layer, a second mid layer, and third inner layer. In an embodiment of the invention, the outer layer may include an electrically conductive spiral wire embedded in a conductive rubber or the spiral wire or a braided wire may be sandwiched between the outer layer and mid layer. The second mid layer is made to have a color that is notably different than a color of the outer layer and the inner layer. An electrically conductive band has one end engaged and connected to the conductive flange and has a portion of an inner side of the band in contact with an outer surface of the first layer and further having another portion of the inner side in contact with an inner surface of the inner layer. An embodiment of the invention includes connecting the conductive wire or braiding to the electrically conductive band. An annular clamp engages the band to the outer surface of the first layer. The clamp also retains the adapter extending from the end of the delivery conduit. The other end of the band is sandwiched between the adapter and the inner layer and the adapter engages the band to the inner surface of the third inner layer. The liner may further include an additional rigid outer conduit having an electrically conductive annular flange extending outwardly from an outer end of the conduit. The flange of the rigid outer conduit may be attached to the flange of the tri layer conduit.

In use, by way of example, the rigid outer conduit may be incorporated into a frac sand trailer to provide a conduit for the frac sand into the trailer. The liner is inserted into the rigid outer conduit and bolts extending through the rigid conduit and liner flanges are used to secure the liner within the rigid outer conduit. When sand is conveyed through the liner into the frac sand trailer, static electricity generated in the liner is grounded and dissipates through the conductive band, conductive flanges and the metal trailer. The abrasive nature of frac sand will wear the inner liner. The user may routinely visually inspect the liner to determine whether the liner should be replaced with a new liner. When the inner surface of the liner changes color the user may conclude that the liner should be replaced.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

Figure 1:
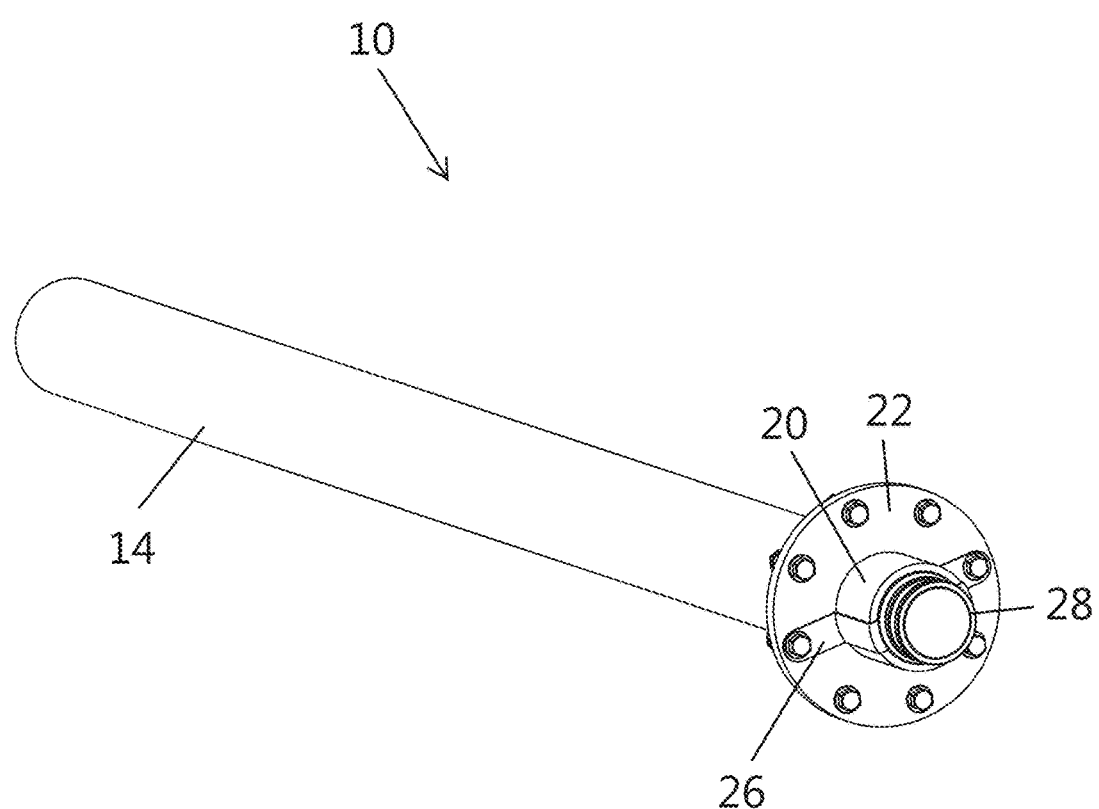
FIG. 1 is a front, left, perspective view of an embodiment of a pipe liner apparatus of the present invention.
Figure 2:
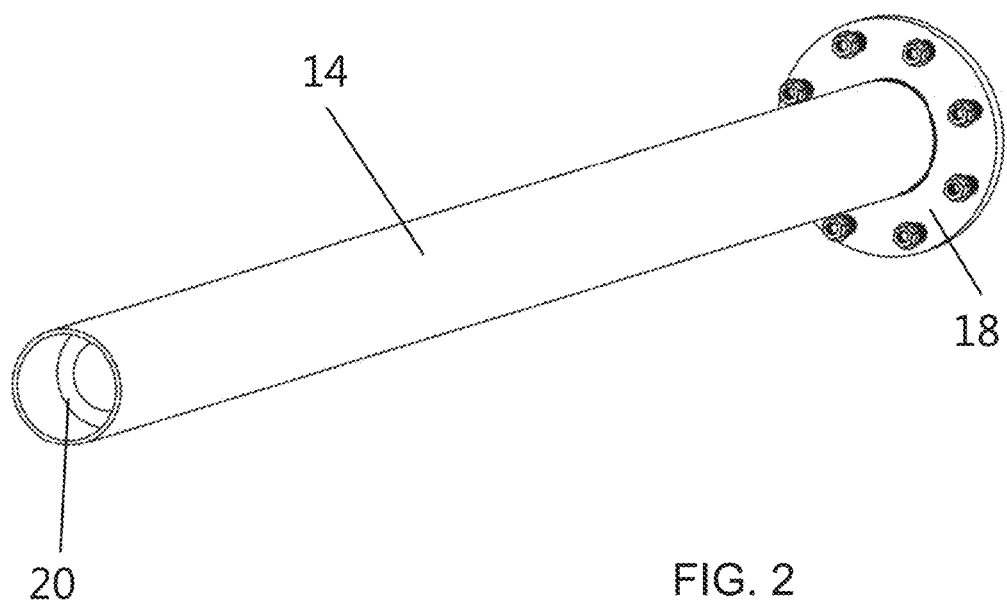
FIG. 2 is a back perspective view of an embodiment of a pipe liner apparatus of the present invention.
Figure 3:
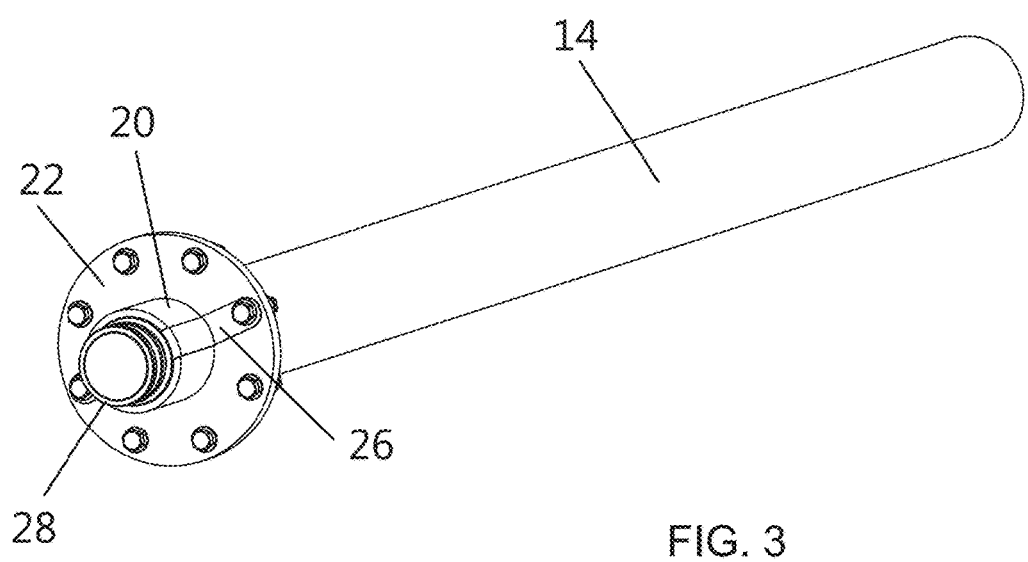
FIG. 3 is a front, right, perspective view of an embodiment of a pipe liner apparatus of the present invention.
Figure 4:
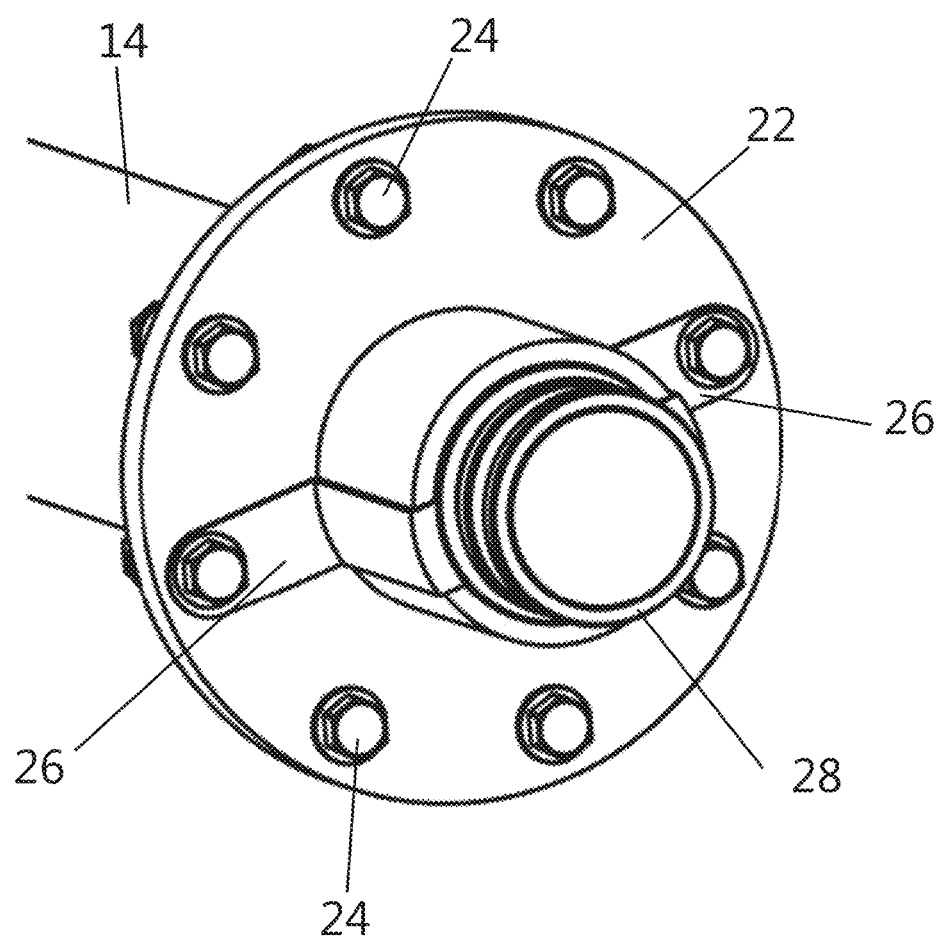
FIG. 4 is a perspective view of an end portion of the pipe liner apparatus of the type shown in FIG. 1.

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The frac sand fill pipe assembly 10 of the present invention is particularly well suited for providing a delivery conduit on frac sand trailers 12. In an embodiment of the invention the assembly includes a rigid carbon steel fill pipe 14 coupled to frac sand trailer 12. Liner 20 extends through fill pipe 14 and an end extends out of the fill pipe. The liner 20 and fill tube 14 are coupled together, however, the liner is easily removed and replaced.

As illustrated in FIGS. 1-4 the fill pipe assembly 10 includes a rigid outer conduit 14 having an electrically conductive flange 18 (shown in FIG. 9), liner 20 having electrically conductive flange 22, and grounding strap or band 26. The liner 20 extends through an interior of fill tube or outer conduit 14. The outer conduit 14 and liner 20 are coupled together at corresponding flanges 18 and 22. Bolts 24 extend through circumferentially spaced and aligned apertures extending through the flanges. Although the apertures in flange 18 may have threading, the apertures may also be sized as clearance holes and nuts 36 and washers 38 may be used to engage and secure the flanges 18 and 22 together. Grounding strap or band 26 has one end of the strap engaged and extending from the liner flange 22 and has a portion of an inner side of the strap 26 in contact with an outer surface or layer of the liner 20. The band or strap 26 further has an inner side of another end portion extending and in contact with an interior surface of the liner 20 and is sandwiched between the liner 20 and adapter 28.

Figure 5:
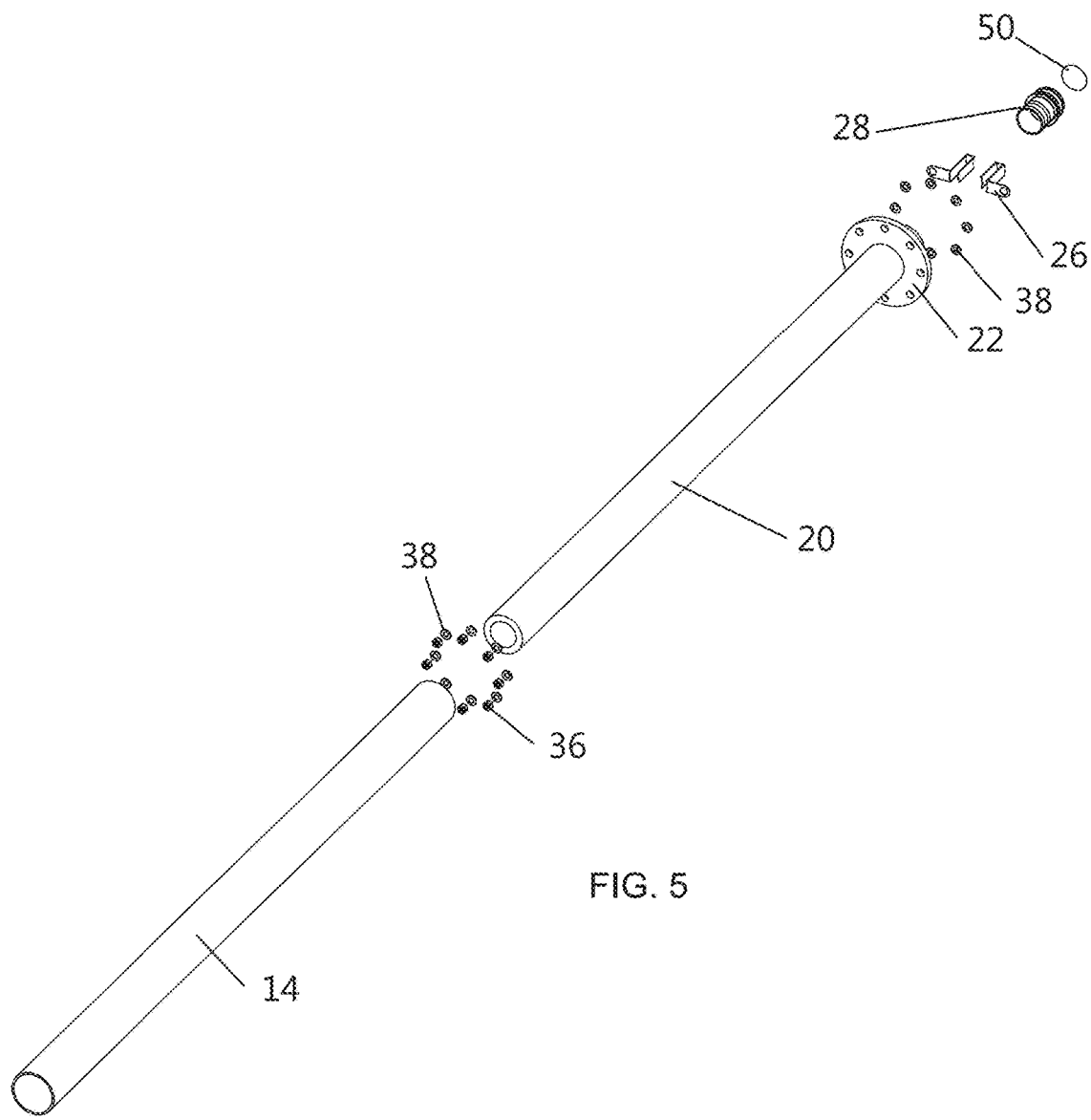
FIG. 5 is an exploded perspective view of portions of the pipe liner apparatus assembly of the present invention.
Figure 6:
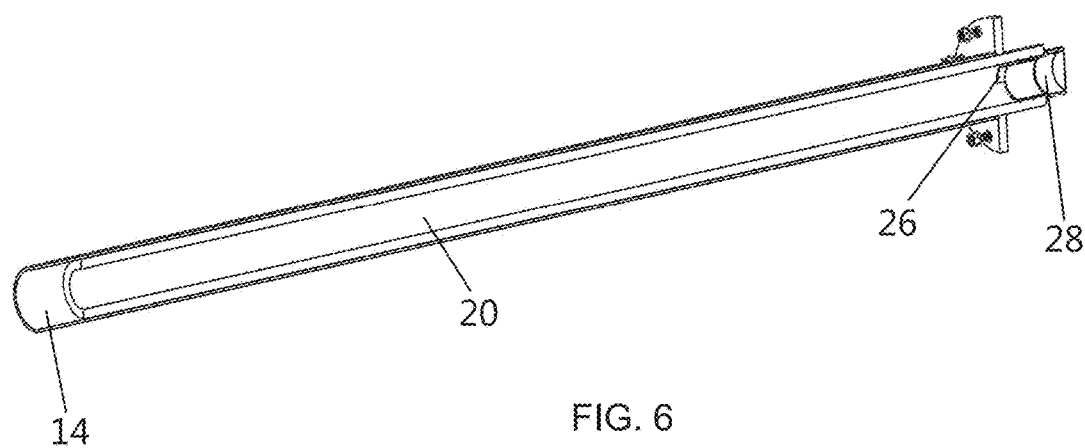
FIG. 6 is a partial sectional perspective view of an embodiment of the pipe liner apparatus of the present invention.
Figure 6:
Figure 7:
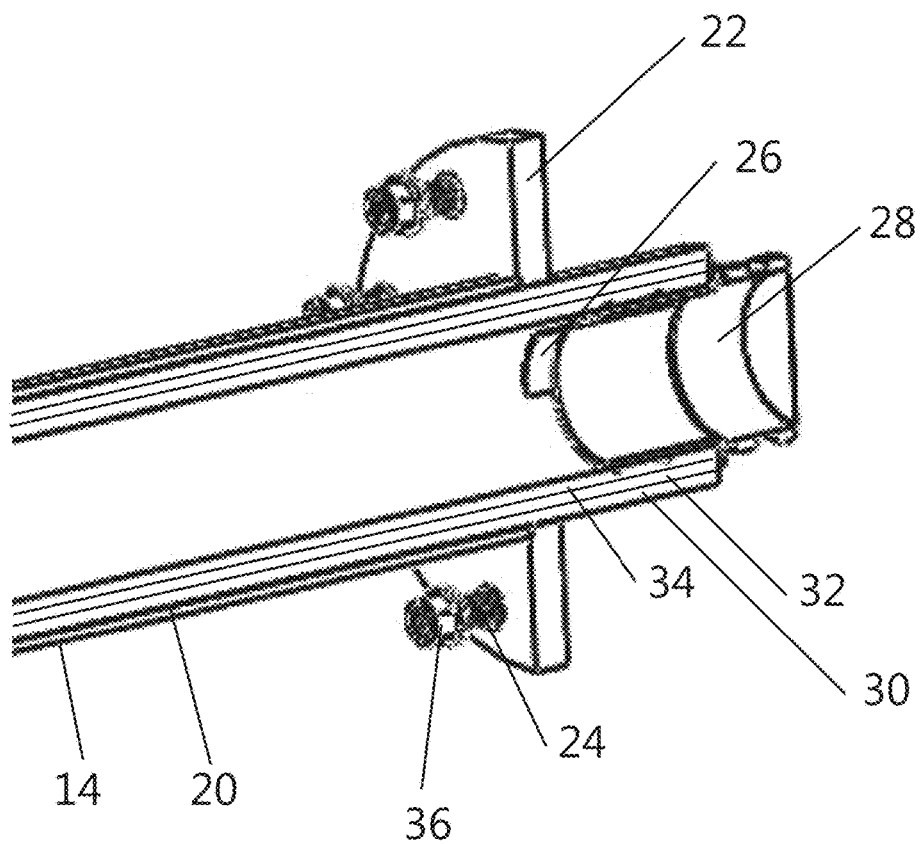
FIG. 7 is a partial sectional perspective view of an end portion of the pipe liner apparatus of the type shown in FIG. 3.

FIGS. 5-7 further illustrates features of the fill pipe assembly 10 and liner 20 of the present invention. The liner 20 includes an outer layer 30, mid layer 32 and inner layer 34. The second mid layer 32 preferably has a color that is notably different than a color of the first outer layer 30 and the third inner layer 34. In this manner, as the material of the inner layers 34 wears away the interior surface of the liner 20 will appear to change color, indicating to a user that the liner has worn to the point that it should be replaced. As noted above, in an alternate embodiment of the invention, an electrically conductive spiral wire or braided mesh wire may be sandwiched between the outer layer 30 and mid layer 32. The inner layer 34 may be manufactured from a commercially available tough and abrasion resistant rubber having an abrasion resistance between 27.3 and 30 $mm^3$ volume loss measured using standard DIN tests. The mid layer 32 may also be manufactured from a commercially available tough and abrasion resistant rubber having a thickness of between 0.4375 inch and 0.500 inch. The mid layer 32 may also have a wear resistance of between 27.3 and 30. The liner may further be manufactured from materials of known suitable construction so that the working pressure (measured in psi) of the liner 20 would exceed 150 psi with a working temperature range between −30° F. and 185° F.

Figure 8:
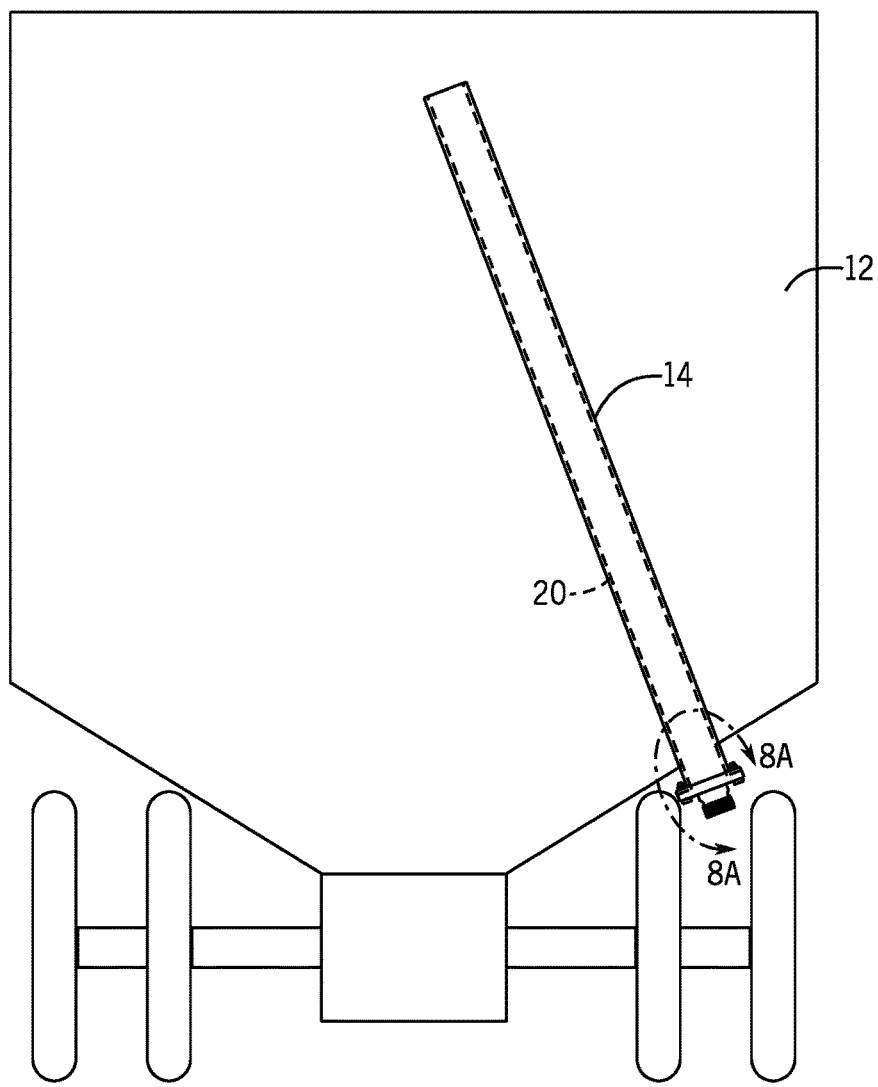
FIG. 8 is a partial end perspective view of a frac sand trailer having the pipe liner apparatus of the present invention incorporated therein.
Figure 8A:
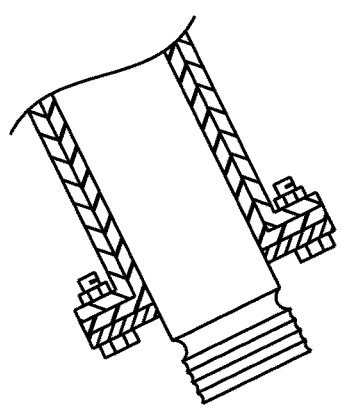
FIG. 8A is a partial sectional view of a portion of the pipe liner apparatus illustrated in FIG. 8 and taken about broken line 8A-8A.
Figure 9:
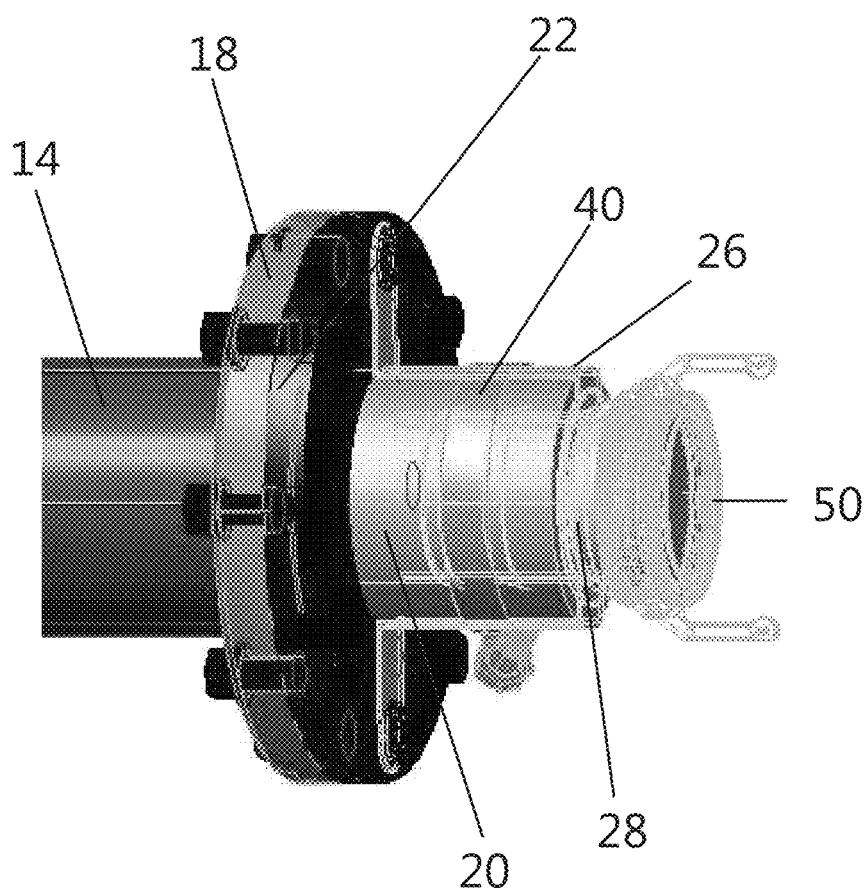
FIG. 9 is a perspective view of an end portion of an embodiment of a pipe liner apparatus of the present invention.
Figure 10:
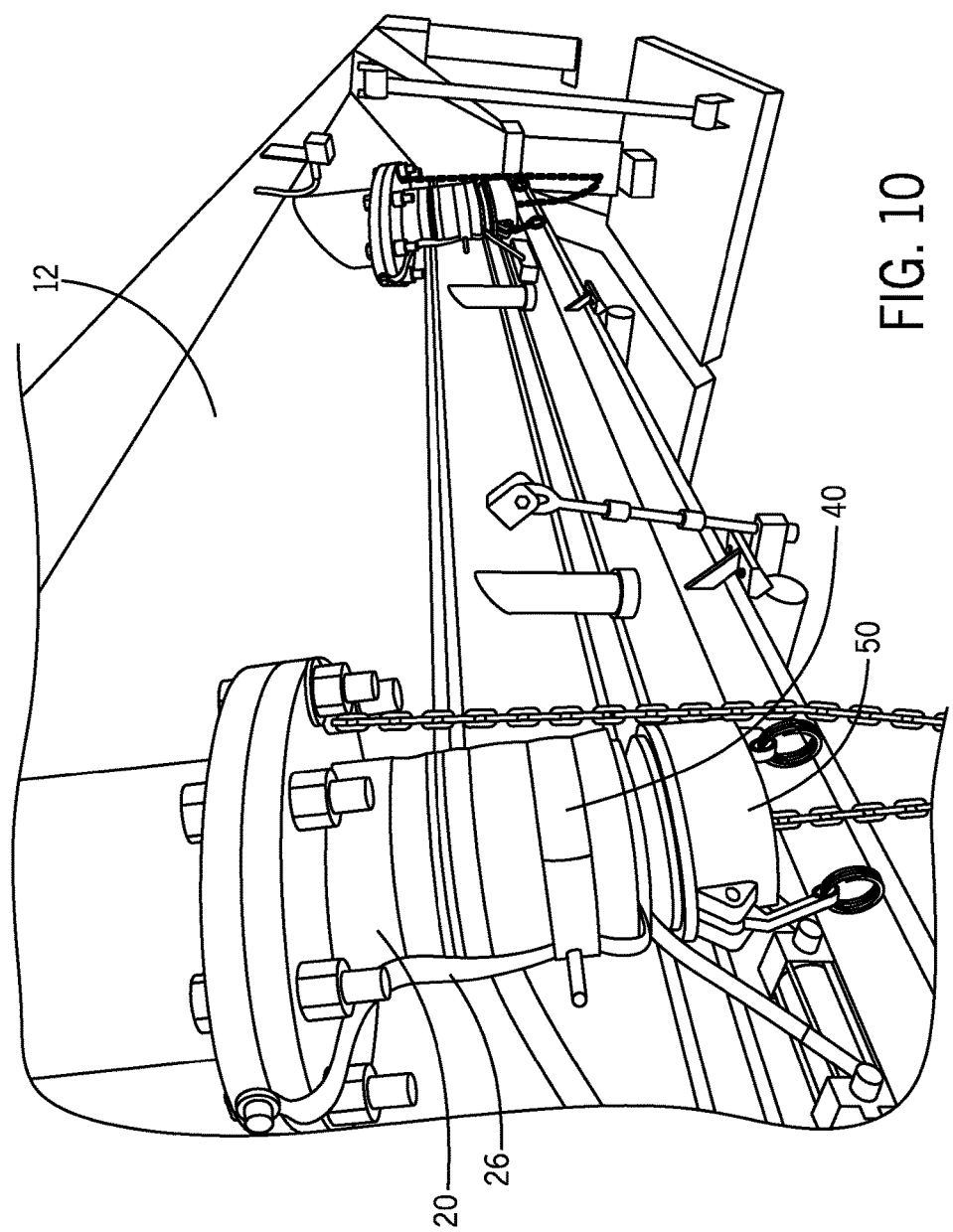
FIG. 10 is a partial side perspective view of a frac sand trailer having an embodiment of the liner assembly of the present invention incorporated therein.

With reference to FIGS. 8-10, those skilled in the art will appreciate that an end of the liner 20 may include adapter 28 held in place by clamp 40. The clamp also engages an inner surface of a portion of the strap 26 against an outer surface of the outer layer 30 of the liner 20. Coupled to an open end of the adapter 28 is a cap 50. By way of example, and without limitation intended, the adapter 28 may be of the commercially available Dixon Valve and Coupling Company barbed fitting having a male camlock fitting type and the cap 50 may be of the Dixon Valve and Coupling Company female camlock cap type. The camlock allows for a quick coupling of a delivery hose to the adapter 28 and quick engagement of the cap 50 when the delivery hose is uncoupled.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. An electrically grounded conduit for delivering abrasive materials having a liner wear indicator, said conduit comprising:
   a delivery conduit having a first electrically insulating outer layer, a second mid layer, and third inner layer, said second mid layer having a color that is notably different than a color of said first outer layer and said third inner layer;
   an electrically conductive annular flange extending outwardly from an outer end of said delivery conduit;
   a first band having one end engaged and extending from said flange and having a portion of an inner side in contact with an outer surface of said first layer and further having another portion of said inner side in contact with an inner surface of said third layer;
an annular clamp engaging said band to said outer surface of said first layer; and
an adapter extending from an end of said delivery conduit and engaging said another portion of said first band to said inner surface of said third layer.

2. The conduit as recited in claim 1, said conduit further comprising a rigid outer conduit having an electrically conductive annular flange extending outwardly from an outer end of said delivery conduit engaged with said flange extending from the delivery conduit.

3. The conduit as recited in claim 1, wherein said third inner layer has abrasive resistance between 27.3 and 30.

4. The conduit as recited in claim 1, wherein said mid layer has a thickness of between 0.4375 inch and 0.500 inch.

5. The conduit as recited in claim 1, wherein said mid layer has a wear resistance of between 27.3 and 30.

6. The conduit as recited in claim 1, wherein said adapter is of a camlock type.

7. An electrically grounded conduit for delivering abrasive materials having a liner wear indicator, said conduit comprising:
   a first rigid delivery conduit having a first electrically conductive annular flange extending outwardly from an outer end of said first delivery conduit;
   a second delivery conduit having a first electrically insulating outer layer, a second mid layer, and third inner layer;
   a second electrically conductive annular flange extending outwardly from an outer end of said second delivery conduit;
   a first band having one end engaged and extending from said second flange and having a portion of an inner side in contact with an outer surface of said first layer and further having another portion of said inner side in contact with an inner surface of said third layer;
   an annular clamp engaging said band to said outer surface of said first layer; and
   an adapter extending from an end of said second delivery conduit and engaging said another portion of said first band to said inner surface of said third layer.

8. The conduit as recited in claim 7, said second mid layer having a color that is notably different than a color of said first outer layer and said third inner layer.

9. The conduit as recited in claim 7, wherein said third inner layer has abrasive resistance between 27.3 and 30.

10. The conduit as recited in claim 7, wherein said mid layer has a thickness of between 0.4375 inch and 0.500 inch.

11. The conduit as recited in claim 7, wherein said mid layer has a wear resistance of between 27.3 and 30.

12. The conduit as recited in claim 7, wherein said adapter is of a camlock type.

13. An electrically grounded conduit for delivering abrasive materials having a liner wear indicator, said conduit comprising:
   a first rigid delivery conduit having a first electrically conductive annular flange extending outwardly from an outer end of said first delivery conduit;
   a second delivery conduit having a first electrically insulating outer layer, a second mid layer, and third inner layer, said second mid layer having a color that is notably different than a color of said first outer layer and said third inner layer;
   a second electrically conductive annular flange extending outwardly from an outer end of said second delivery conduit;
   a first band having one end engaged and extending from said second flange and having a portion of an inner side in contact with an outer surface of said first layer and further having another portion of said inner side in contact with an inner surface of said third layer;
   an annular clamp engaging said band to said outer surface of said first layer; and
   an adapter extending from an end of said second delivery conduit and engaging said another portion of said first band to said inner surface of said third layer.

14. The conduit as recited in claim 13, wherein said third inner layer has abrasive resistance between 27.3 and 30.

15. The conduit as recited in claim 13, wherein said mid layer has a thickness of between 0.4375 inch and 0.500 inch.

16. The conduit as recited in claim 13, wherein said mid layer has a wear resistance of between 27.3 and 30.

17. The conduit as recited in claim 13, wherein said adapter is of a camlock type.

* * * * *